US012496508B1

(12) United States Patent
Harris

(10) Patent No.: US 12,496,508 B1
(45) Date of Patent: Dec. 16, 2025

(54) DOUBLE BINGO DAUBER

(71) Applicant: Randall Harris, Pueblo, CO (US)

(72) Inventor: Randall Harris, Pueblo, CO (US)

( * ) Notice: Subject to any disclaimer, the term of this patent is extended or adjusted under 35 U.S.C. 154(b) by 0 days.

(21) Appl. No.: 18/825,738

(22) Filed: Sep. 5, 2024

(51) Int. Cl.
*A63F 3/06* (2006.01)
*B05C 1/00* (2006.01)
*B05C 17/00* (2006.01)

(52) U.S. Cl.
CPC .............. *A63F 3/0625* (2013.01); *B05C 1/00* (2013.01); *B05C 17/00* (2013.01)

(58) Field of Classification Search
CPC ......... A63F 3/0625; B05C 17/00; B05C 1/00; B05C 1/02; B05C 17/05
USPC ......................... 401/205, 206, 263, 264, 266
See application file for complete search history.

(56) References Cited

U.S. PATENT DOCUMENTS 4,601,598 A * 7/1986 Schwartz ............. B43K 23/004 401/6
4,795,156 A 1/1989 Paulish
5,692,846 A * 12/1997 Schwarzberg ........ B05C 17/002 401/190
D401,270 S 11/1998 Cockram
5,899,624 A 5/1999 Thompson
6,913,405 B2 7/2005 Fischer
D611,986 S 3/2010 Ott
D687,494 S 8/2013 McVay-Kaiser
D744,036 S 11/2015 Blakney
11,109,659 B2 * 9/2021 Bruder ................... B65D 47/42
2005/0141949 A1 6/2005 Calabro
2007/0110506 A1 * 5/2007 Erickson ............. A61M 35/003 401/205

FOREIGN PATENT DOCUMENTS

WO WO20110693186 5/2011

* cited by examiner

*Primary Examiner* — David J Walczak

(57) ABSTRACT

A double bingo dauber includes a handle and an ink applicator assembly. The handle includes an interior cavity containing a supply of ink therein. The ink applicator assembly is connected to an end of the handle and includes an applicator head designed to simultaneously mark both numbers in a space of a double bingo card in a single pressing.

7 Claims, 7 Drawing Sheets

DOUBLE BINGO DAUBER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bingo game accessories and more particularly pertains to a new double bingo dauber for use with the bingo game variation known as double bingo. In regular or standard bingo, a 5×5 grid features the B-I-N-G-O letter columns and a variety of numbers in the spaces of the grid, with only one number per space. As letter-number combinations are called out, the player marks the number using a chip or a dauber that has a circular applicator head to mark the space as being called. In contrast, double bingo has the same grid style as standard bingo, but the individual spaces, which are usually squares in standard bingo, are expanded in size, usually to rectangles, to accommodate two numbers per square. During play, if either number is called out, the entire space is considered called, giving a player two options or chances to mark one space. Due to the expanded size and double numbers, players must mark the space twice using the smaller traditional daubers that only cover one number. This leaves considerable unmarked area in the space and can lead to confusion as to whether or not a space is marked, as well as whether or not the player has completed a successful bingo. The double bingo dauber solves this problem by using an oversized applicator head that is wide enough to simultaneously ink both numbers or cover all or essentially all of the space.

(2) Description of Related Art Including Information Disclosed Under 37 CFR 1.97 and 1.98

The prior art relates to bingo game accessories. The prior art, as best understood, does not disclose a double bingo dauber that includes a handle and an ink applicator assembly that includes an applicator head designed to simultaneously mark both numbers in a space of a double bingo card in a single pressing.

BRIEF SUMMARY OF THE INVENTION

An embodiment of the disclosure meets the needs presented above in a double bingo dauber generally comprising a handle and an ink applicator assembly. The handle includes an interior cavity containing a supply of ink therein. The ink applicator assembly is connected to an end of the handle and includes an applicator head designed to simultaneously mark both numbers in a space of a double bingo card in a single pressing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
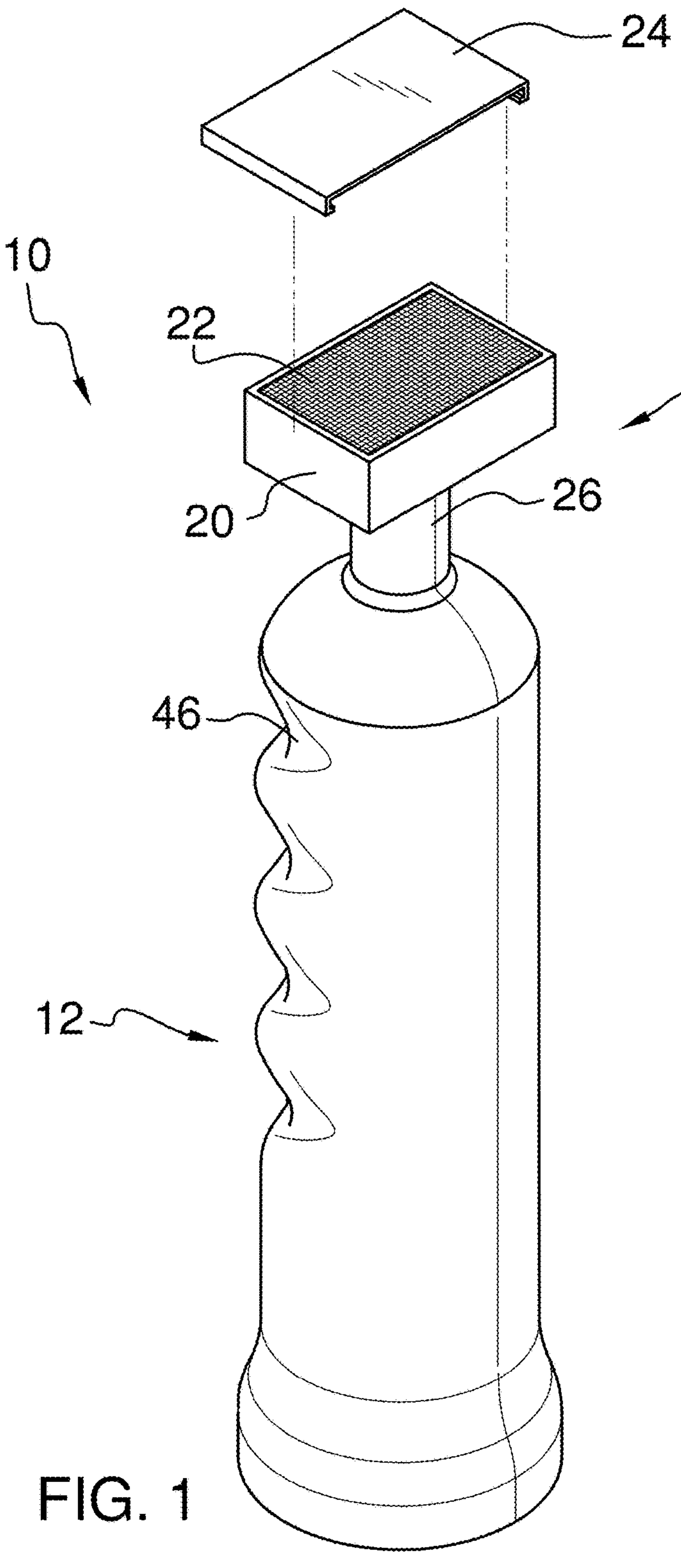
FIG. 1 is a perspective view of a double bingo dauber according to an embodiment of the disclosure.
Figure 2:
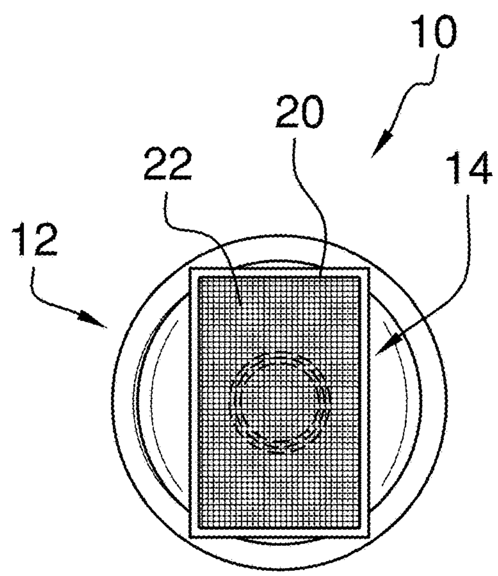
FIG. 2 is an end view of an embodiment of the disclosure.

With reference now to the drawings, and in particular to FIGS. 1 through 8 thereof, a new double bingo dauber embodying the principles and concepts of an embodiment of the disclosure and generally designated by the reference numeral 10 will be described.

As best illustrated in FIGS. 1 through 8, the double bingo dauber 10 generally comprises a handle 12 and an ink applicator assembly 14. The handle 12 includes an interior cavity 16 containing a supply of ink 18 therein. The ink applicator assembly 14 is connected to an end of the handle 12 and includes an applicator head 20 designed to simultaneously mark both numbers 64 in a space 62 of a double bingo card 60 in a single pressing.

Figure 5:
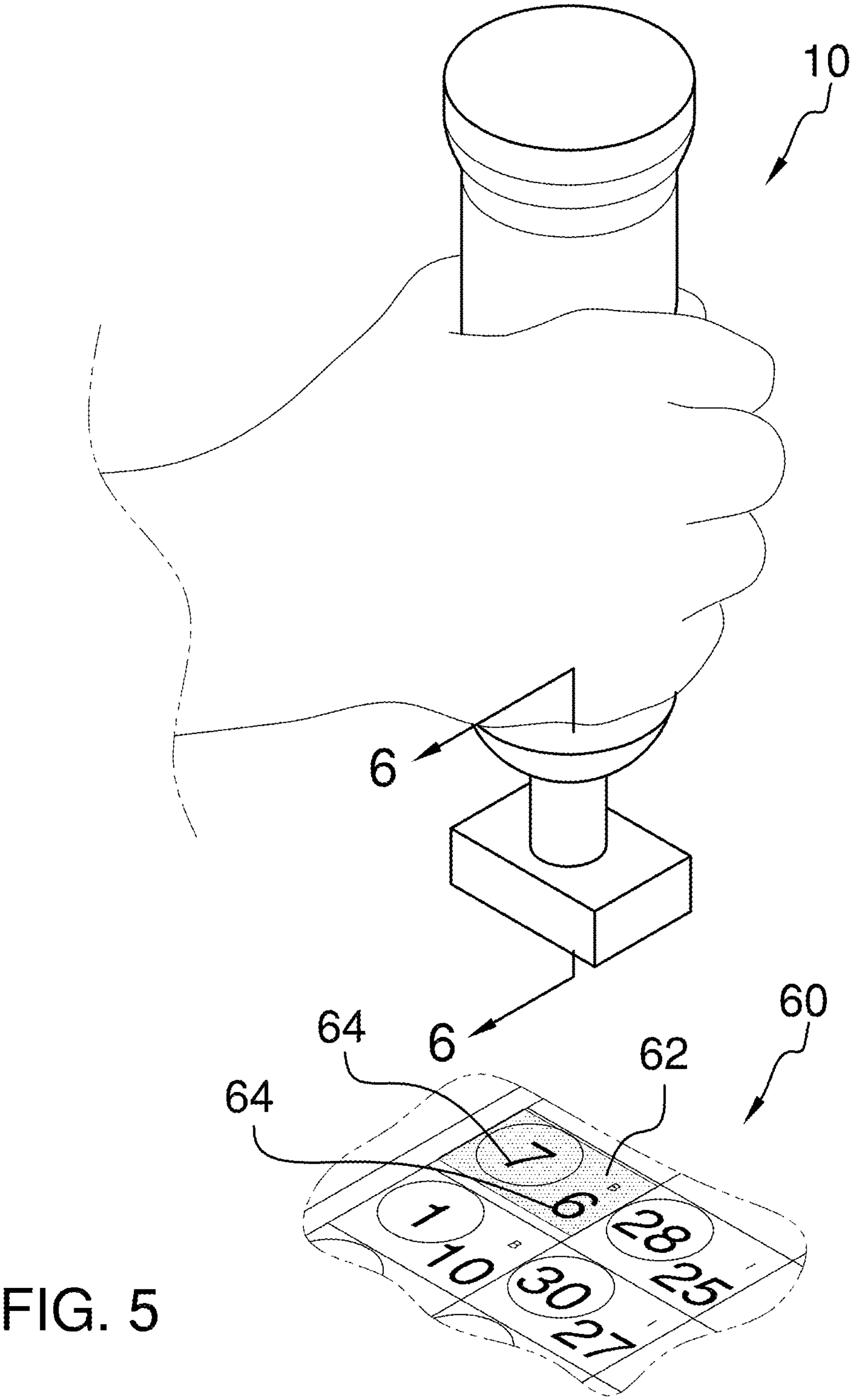
FIG. 5 is a perspective view of an embodiment of the disclosure in use.

In the exemplary embodiment in the figures, the applicator head 20 is rectangular and dimensioned to cover all or essentially all of a rectangular space 62 of a double bingo card 60, as shown in FIG. 5. In another possible embodiment, the applicator head 20 could be oval or rounded, provided that the applicator head 20 effectively marks both numbers 64 or most of the space 62.

The applicator head 20 includes an ink pad 22 that is made of microfiber material, though other materials could be used. As shown in FIG. 1, the ink applicator assembly 14 includes a cap 24 detachably connected to the applicator head 20 to cover the ink pad 22 when not in use.

Figure 6:
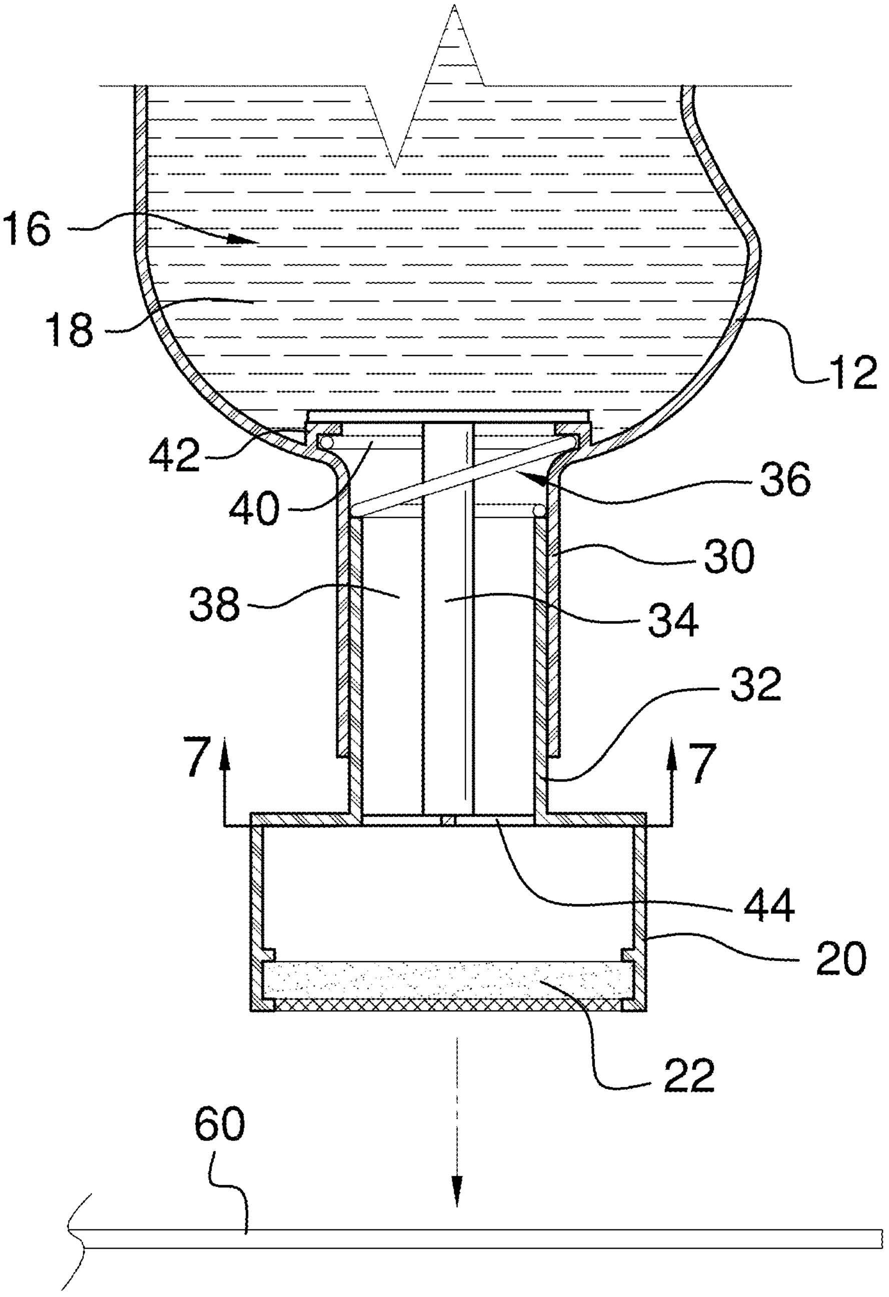
FIG. 6 is a cross-sectional view of an embodiment of the disclosure.
Figure 7:
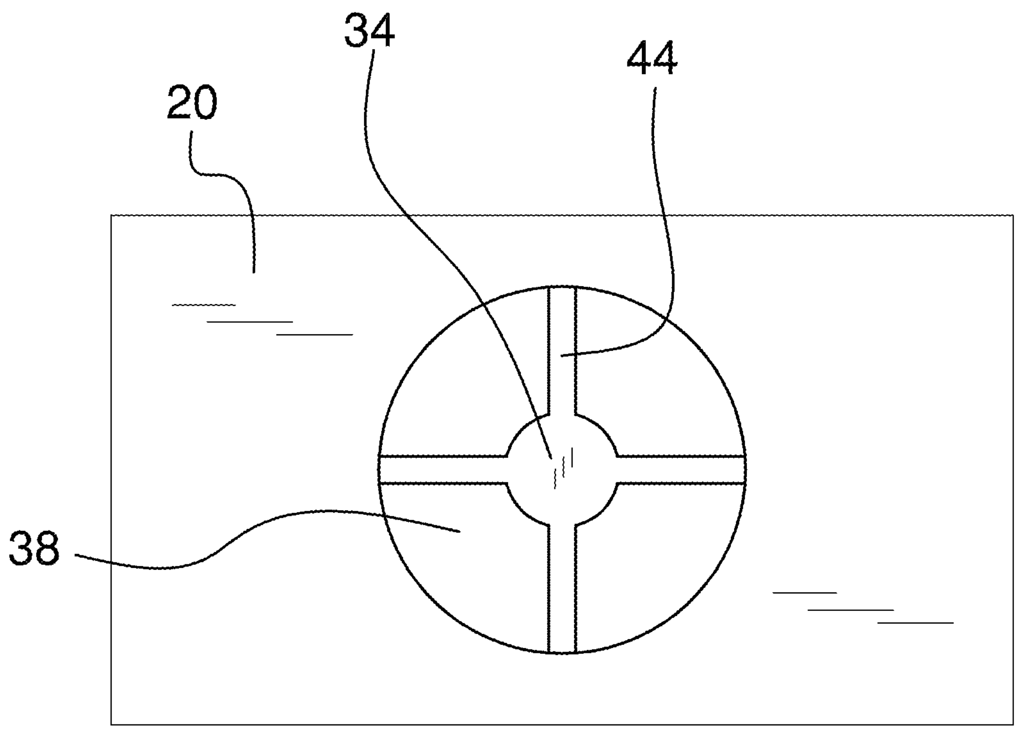
FIG. 7 is a bottom view of an embodiment of the disclosure.
Figure 8:
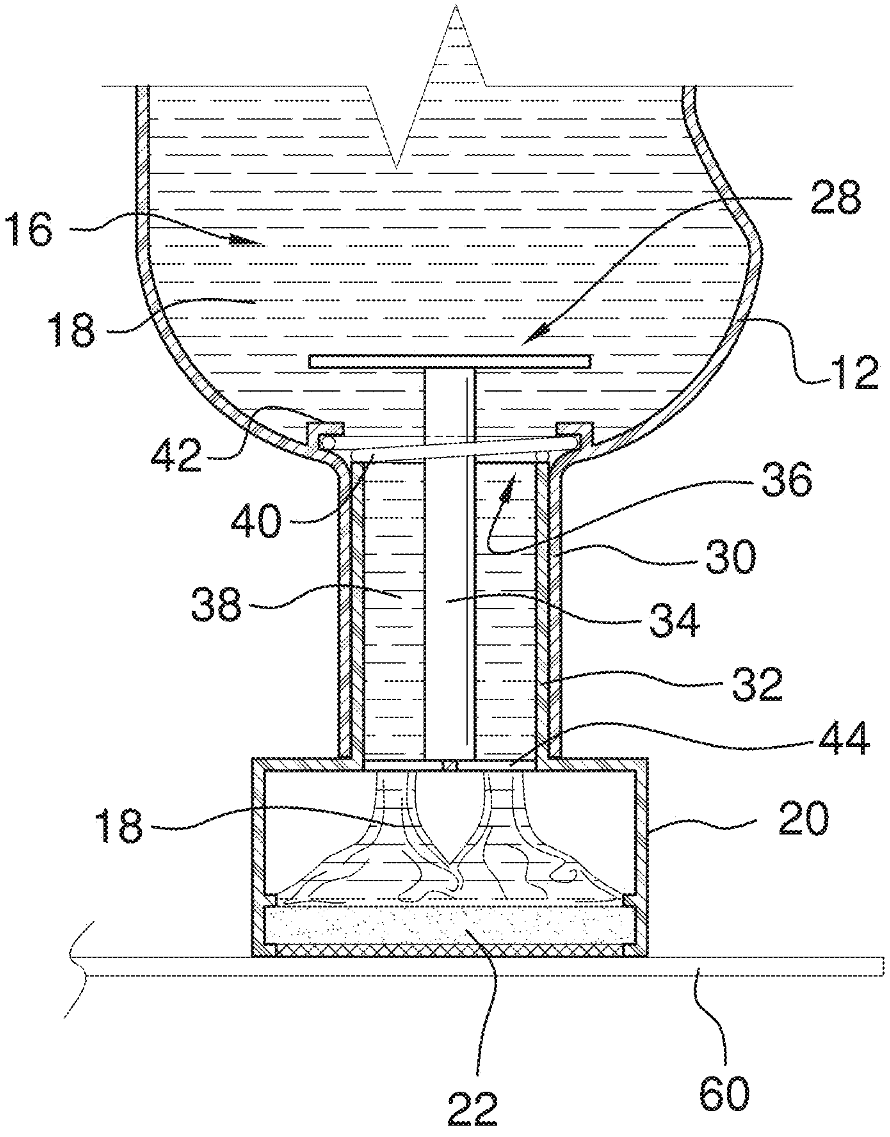
FIG. 8 is a cross-sectional view of an embodiment of the disclosure.

The ink applicator assembly 14 includes a neck portion 26 connecting the applicator head 20 to the handle 12 and a valve assembly 28 positioned within the neck portion 26. As best seen in FIGS. 6 through 8, the neck portion 26 includes a first section 30 attached to the handle 12 and a second section 32 movable with respect to the first section 30 in a telescoping manner. The valve assembly 28 includes a plunger 34 attached to the applicator head 20 that is designed to cover an opening 36 connecting the interior cavity 16 to an interior passage 38 in the neck portion 26. The valve assembly 28 includes a spring 40 attached to the handle 12, which spring 40 is operatively connected to the applicator head 20. For example, the spring 40 can be mounted in a shoulder or bracket 42 in the interior cavity 16. The spring 40 can either be attached to or placed in contact with the second section 32 of the neck portion 26. The valve assembly 28 is openable by pressing the applicator head 20 against the spring 40 into a compressed position, as shown in FIG. 8, which displaces the plunger 34 out of engagement with the opening 36. The ink 18 is now able to flow from the interior cavity 16 and into the neck section 32. The plunger 34 is closable by releasing the applicator head 20 and permitting the spring 40 to bias the applicator head 20 into an extended position, as shown in FIG. 6, and thereby move the plunger 34 into engagement with the opening 36. FIG. 7 shows an example of how the plunger 34 could be connected to the second neck portion 26 and the applicator head 20, wherein the plunger 34 is connected by arms 44 arranged in a cross. The ink 18 can flow through the spaces between the arms 44. It should be understood that FIGS. 6 through 8 show one possible embodiment of how the ink applicator assembly 14 could be designed to regularly release ink 18 from the interior cavity 16 to the applicator head 20 to keep the applicator head 20 sufficiently inked for use, and there are other possible designs and configurations that are well known in ink stamping technology.

Figure 3:
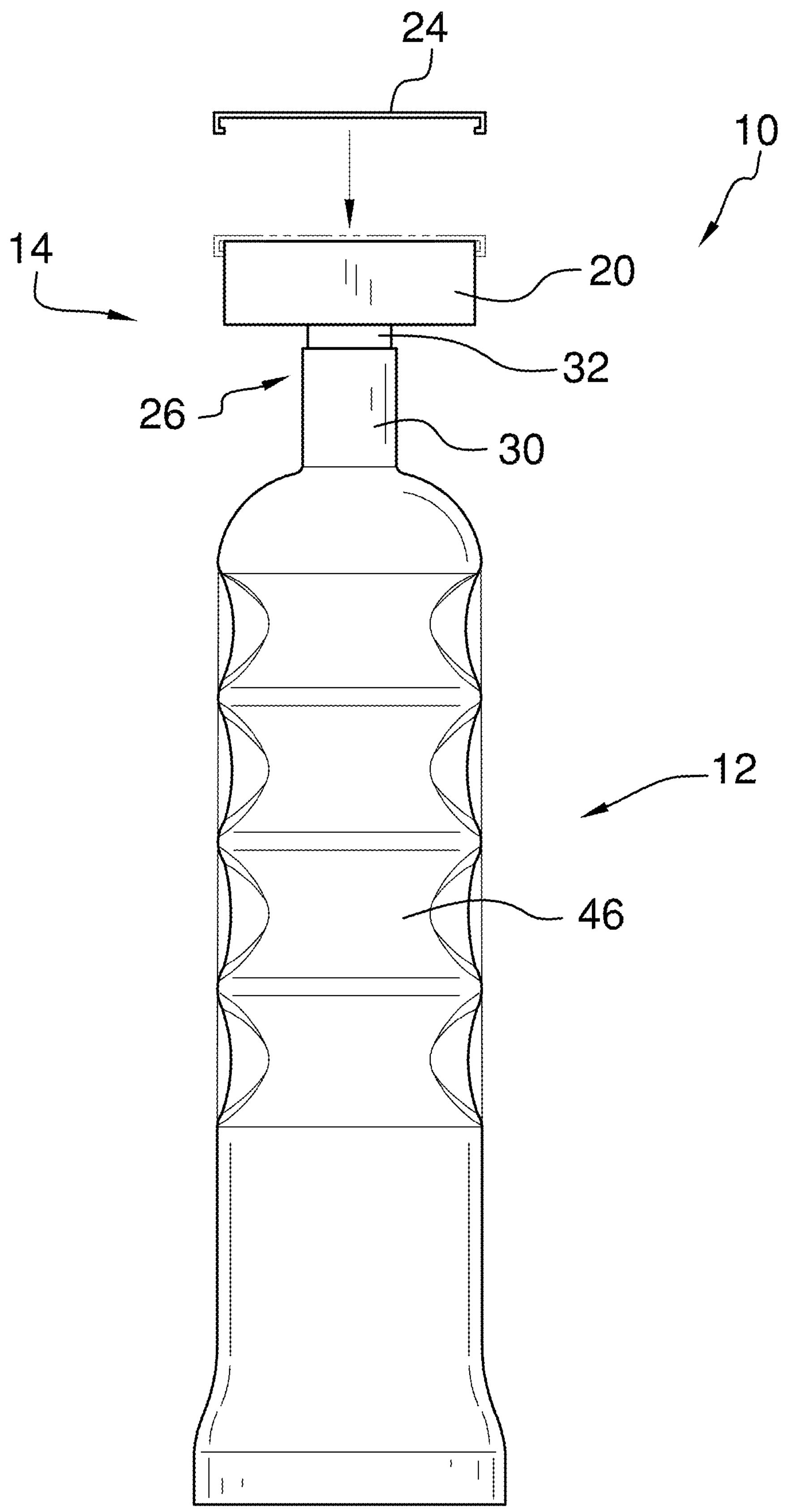
FIG. 3 is a front view of an embodiment of the disclosure.
Figure 4:
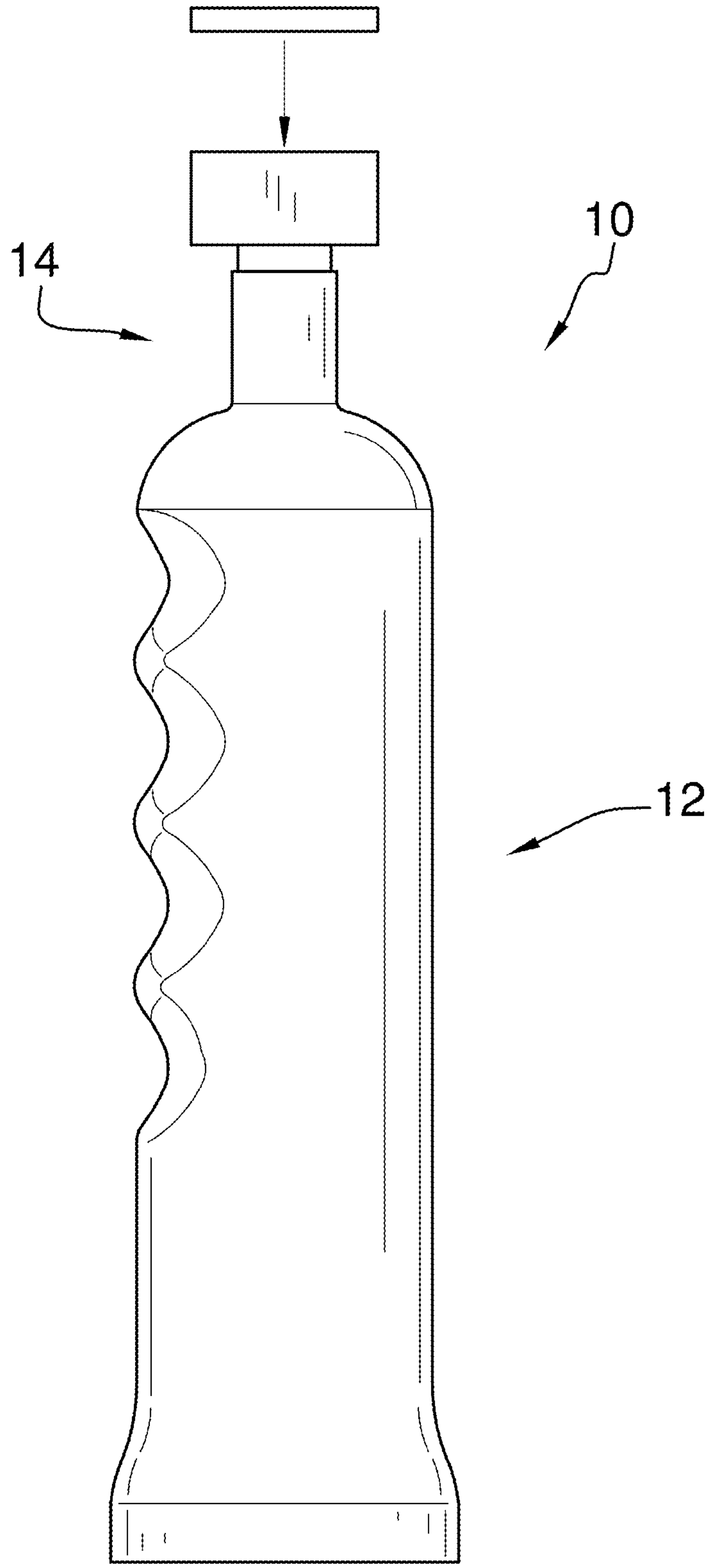
FIG. 4 is a side view of an embodiment of the disclosure.

As shown in FIGS. 1, 3, and 4, the handle 12 includes indents 46 designed to be gripped by fingers of a user. Alternatively, the handle 12 could be a cylinder or have a different ergonomic design. In one possible embodiment, the handle 12 also includes an outer surface portion made of soft resilient cushion material. However, the handle 12 could also be made of a stiff material, such as a hard plastic.

FIG. 5 shows the use of the double bingo dauber 10. As has been discussed above, the double bingo dauber 10 can be used to ink all or essentially all of the space 62, thereby marking the space 62 and both numbers 64 in a single pressing.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A double bingo dauber comprising:

a handle comprising an interior cavity containing a supply of ink therein; and an ink applicator assembly connected to an end of said handle and comprising an applicator head configured to simultaneously mark both numbers in a space of a double bingo card in a single pressing, wherein said applicator head comprises an ink pad comprising microfiber material, said ink pad having an outwardly facing surface being coplanar with a bottommost edge of said ink assembly.

2. The double bingo dauber of claim 1, wherein said applicator head is rectangular and dimensioned to cover all of a rectangular space of a double bingo card.

3. The double bingo dauber of claim 1, wherein said ink applicator assembly comprises a cap detachably connected to said applicator head to cover said ink pad when not in use.

4. The double bingo dauber of claim 1, wherein said ink applicator assembly comprises a neck portion connecting said applicator head to said handle and a valve assembly disposed within said neck portion, wherein:

said neck portion comprises a first section attached to said handle and a second section movable with respect to said first section in a telescoping manner;

said valve assembly comprises a plunger attached to said applicator head and configured to cover an opening connecting said interior cavity to an interior passage in said neck portion; and said valve assembly comprises a spring attached to said handle and operatively connected to said applicator head, wherein said valve assembly is openable by pressing said applicator head against said spring into a compressed position and thereby displacing said plunger out of engagement with said opening, and closable by releasing said applicator head and permitting said spring to bias said applicator head into an extended position and thereby moving said plunger into engagement with said opening.

5. The double bingo dauber of claim 1, wherein said handle comprises indents configured to be gripped by fingers of a user.

6. The double bingo dauber of claim 1, wherein said handle comprises an outer surface portion made of soft resilient cushion material.

7. A double bingo dauber comprising:

a handle comprising an interior cavity containing a supply of ink therein, wherein:

said handle comprises indents configured to be gripped by fingers of a user;

said handle comprises an outer surface portion made of soft resilient cushion material; and an ink applicator assembly connected to an end of said handle and comprising an applicator head configured to simultaneously mark both numbers in a space of a double bingo card in a single pressing, wherein:

said applicator head is rectangular and dimensioned to cover all of a rectangular space of a double bingo card;

said applicator head comprises an ink pad comprising microfiber material, said ink pad having an outwardly facing surface being coplanar with a bottommost edge of said ink assembly;

said ink applicator assembly comprises a cap detachably connected to said applicator head to cover said ink pad when not in use;

said ink applicator assembly comprises a neck portion connecting said applicator head to said handle and a valve assembly disposed within said neck portion, wherein:

said neck portion comprises a first section attached to said handle and a second section movable with respect to said first section in a telescoping manner;

said valve assembly comprises a plunger attached to said applicator head and configured to cover an opening connecting said interior cavity to an interior passage in said neck portion;

said valve assembly comprises a spring attached to said handle and operatively connected to said applicator head, wherein said valve assembly is openable by pressing said applicator head against said spring into a compressed position and thereby displacing said plunger out of engagement with said opening, and closable by releasing said applicator head and permitting said spring to bias said applicator head into an extended position and thereby moving said plunger into engagement with said opening.

* * * * *